(12) United States Patent
Bonmassar et al.

(10) Patent No.: US 8,719,179 B2
(45) Date of Patent: May 6, 2014

(54) RECRUITING SERVICE GRAPHICAL USER INTERFACE

(75) Inventors: Luca Bonmassar, Marina di Massa (IT); John Dane Smilanick, Santa Clara, CA (US)

(73) Assignee: Gild, Inc., San Francisco, CO (US)

( * ) Notice: Subject to any disclaimer, the term of this patent is extended or adjusted under 35 U.S.C. 154(b) by 26 days.

(21) Appl. No.: 13/493,791

(22) Filed: Jun. 11, 2012

(65) Prior Publication Data

US 2013/0290205 A1    Oct. 31, 2013

Related U.S. Application Data

(60) Provisional application No. 61/640,656, filed on Apr. 30, 2012.

(51) Int. Cl.
*G06Q 10/00*    (2012.01)

(52) U.S. Cl.
USPC ............................. 705/321; 705/319; 705/320

(58) Field of Classification Search
USPC ............................................. 705/1, 320, 321
See application file for complete search history.

(56) References Cited

U.S. PATENT DOCUMENTS

| | | | |
|---|---|---|---|
| 6,385,620 B1* | 5/2002 | Kurzius et al. ......................... 1/1 |
| 8,112,365 B2 | 2/2012 | Foster | |
| 2003/0125970 A1 | 7/2003 | Mittal et al. | |
| 2006/0042483 A1* | 3/2006 | Work et al. ...................... 101/91 |
| 2006/0224451 A1 | 10/2006 | Kerschbrock et al. | |
| 2007/0156653 A1* | 7/2007 | Garg ................................. 707/3 |
| 2007/0250374 A1 | 10/2007 | Ryckman et al. | |
| 2009/0006206 A1* | 1/2009 | Groe et al. ....................... 705/14 |
| 2009/0187414 A1 | 7/2009 | Haskins et al. | |
| 2009/0187473 A1 | 7/2009 | Blaze et al. | |
| 2009/0228323 A1 | 9/2009 | Ebrahimian | |
| 2010/0153290 A1 | 6/2010 | Duggan | |
| 2011/0077989 A1 | 3/2011 | Akred et al. | |
| 2011/0078154 A1 | 3/2011 | Rickman et al. | |
| 2011/0196712 A1* | 8/2011 | Norelli ......................... 705/7.11 |
| 2011/0196802 A1 | 8/2011 | Ellis et al. | |
| 2011/0252394 A1* | 10/2011 | Sharma et al. ................ 717/101 |
| 2011/0313963 A1 | 12/2011 | Liu et al. | |
| 2012/0005113 A1 | 1/2012 | Kotis | |
| 2012/0066088 A1 | 3/2012 | Murset | |
| 2013/0006881 A1 | 1/2013 | Klemm | |
| 2013/0290206 A1 | 10/2013 | Desai et al. | |
| 2013/0290207 A1 | 10/2013 | Bonmassar | |
| 2013/0290208 A1 | 10/2013 | Bonmassar et al. | |
| 2014/0032435 A1 | 1/2014 | Desai | |

OTHER PUBLICATIONS

Greenemeier, L. ("In Search of Experts". InformationWeek, 2004, (1013), 36-42) discloses searching SourceForge.net, a repository for open-source code, to see which programmers are working on projects that demonstrate valuable skills. (p. 3; para. 12).*

(Continued)

*Primary Examiner* — Gabrielle McCormick
(74) *Attorney, Agent, or Firm* — Kwan & Olynick LLP (57) ABSTRACT

A recruiting service is disclosed that generates profiles of software developers having specific skills. Public code repositories are examined to identify projects of software developers. The projects are analyzed to estimate the number of years of experience a software developer has with an individual language and determine a score with respect to other developers. Social media information and a messaging link may also be provided with each profile. A graphical user interface for displaying the information is disclosed.

26 Claims, 5 Drawing Sheets

(56) References Cited

OTHER PUBLICATIONS

U.S. Appl. No. 13/557,812, filed Jul. 25, 2012.
U.S. Appl. No. 13,568,493, filed Aug. 7, 2012.
U.S. Appl. No. 13/652,749, filed Oct. 16, 2012.
U.S. Appl. No. 13/739,381, filed Jan. 11, 2013.
"Int'l Application Serial No. PCT/US2013/038702, Srch Rpt & Written Opinion mailed Aug. 20, 2013", 19 pgs.
"U.S. Appl. No. 13/557,812, Non Final Office Action mailed Oct. 24, 2013", 13 pgs.

\* cited by examiner

Bio summary

I tweet for the amusement of my friends. If you're looking for game/tech/social/blahblah insights, you will be disappointed.

— 430

★ Projects  ✕ Contributions

Projects created by Michael Bayne
— 440

— 445

≡ 1.5K  👁 1  👤 1 samskivert/corean-java-reader
Generates resolved-name metadata for Java code (for use by Corean)

— 445

≡ 15.7K  👁 10  👤 5 samskivert/pythagoras
A portable library of geometry classes for Java

Employment history   410

| Company | Role |
|---|---|
| Three Rings | |
| Go2Net, inc. | |
| Qualcomm | Engineer |

420

Social profiles

425

✎ http://samskivert.com/

425

✎ http://www.google.com/reader/sha...

425
samskivert 425
samskivert

425
michael-bayne-1

425
samskivert 425
samskivert 425
samskivert

RECRUITING SERVICE GRAPHICAL USER INTERFACE

CROSS REFERENCE TO RELATED APPLICATIONS

The present application claims the benefit of provisional application 61/640,656, filed Apr. 30, 2012, entitled RECRUITING SERVICE GRAPHICAL USER INTERFACE, the contents of which are hereby incorporated by reference.

FIELD OF THE INVENTION

The present invention is generally related to employment recruitment tools. More particularly, the present invention is directed to a user interface, search technology, and scoring technique to automatically provide information to aid in recruiting software developers.

BACKGROUND OF THE INVENTION

Recruiting skilled software developers is a difficult task. How does one find qualified candidates? Many of the conventional recruiting approaches based on reviewing resumes do not work well for recruiting software developers.

One of the problems in the prior art is identifying individuals who have expertise in specific software languages as well as the passion and ingenuity to solve specific problems. How does a recruiter evaluate the actual skills and talents of prospective candidates? Education alone is not adequate to determine actual talent. Nor is the number of years working in industry a good measure of talent.

Another problem in the prior art is identifying whether a candidate for a software development position will be a good social fit for a company. Conventional resumes do not provide a good indicator of the social fit of a candidate.

One aspect of these problems in the prior art is that it is difficult to perform a pre-screening to identify talented candidates to fill a software development position. As a result, many companies waste enormous amounts of time trying to find qualified candidates to fill software development positions. Additionally, the difficulties in assessing the actual talent of a candidate means that companies sometimes end up with employees that cannot perform as expected.

SUMMARY OF THE INVENTION

A recruiting service generates a graphical user interface in response to a query. The graphical user interface provides profile information for software developers. The profile information includes a ranking based on analysis of public code repositories and may also include other information regarding the knowledge, experience, and influence of a developer. The profile information may also be augmented with additional social media information, such as social media links for a developer. A messaging link may also optionally be provided to contact a developer. The recruiting service thus permits a user to input a query to find software developers with specific skills and receive a graphical user interface providing objective evaluation information based on the code written by the developer.

DETAILED DESCRIPTION

Figure 1:
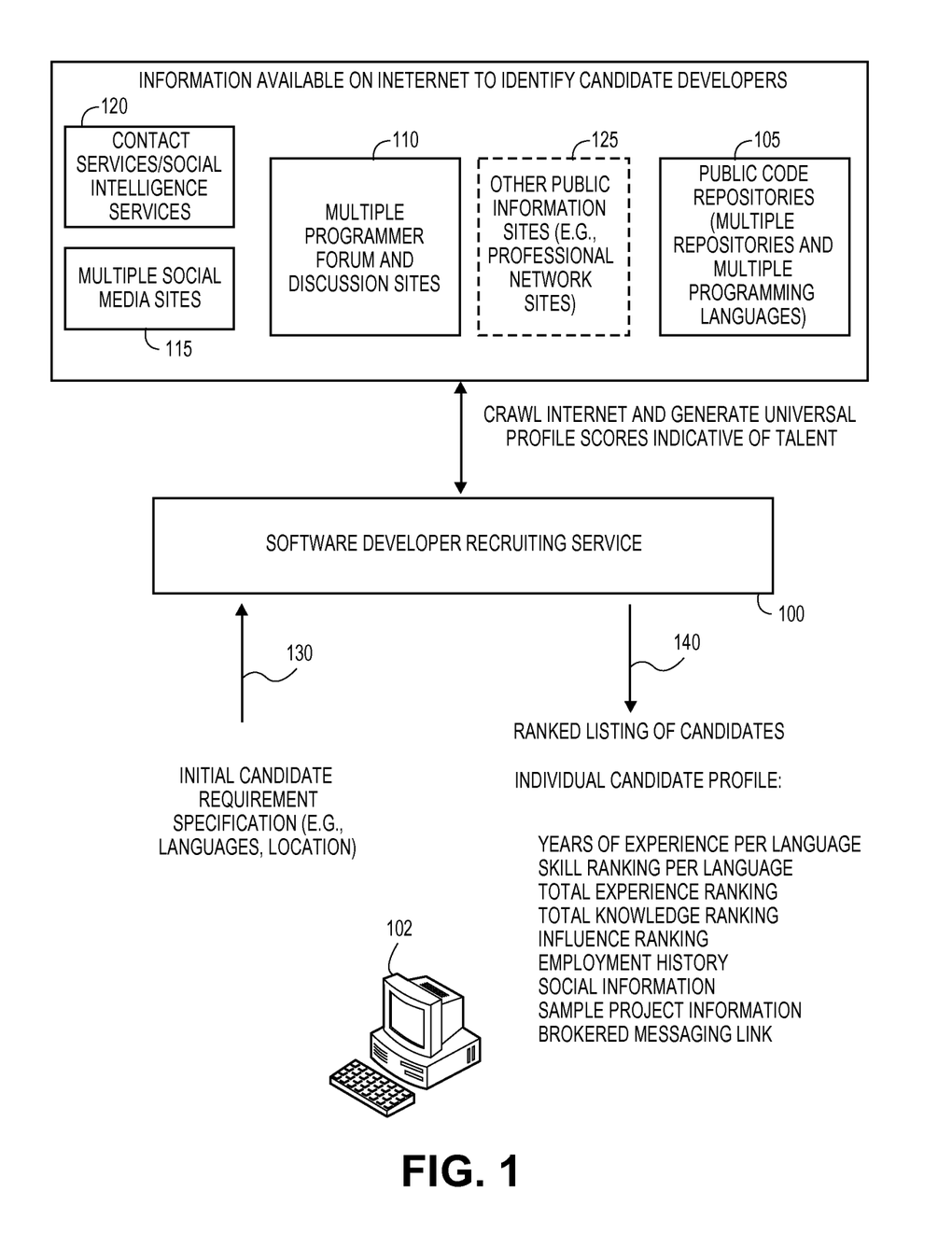
FIG. 1 is a high level diagram illustrating a recruiting service for software developers in accordance with an embodiment of the present invention.

FIG. 1 is a high level system diagram of a recruiting service 100 in accordance with an embodiment of the present invention. The recruiting service 100 is a computer-implemented service that may include one or more servers and associated hardware, such as computer processors, a database, and a memory for storing computer program instructions. The recruiting service 100 accesses information sources on the Internet to obtain information on software developers to develop profile information that includes information about the skills and experience of software developers.

In some situations a large organization could maintain the recruiting service as an in-house tool available to users within the organization via a local area network or Intranet. However, more generally the recruiting service may be implemented as a web-hosted service available over the Internet to individuals, companies, or organizations seeking to obtain information on potential candidates for software development positions.

An exemplary set of Internet information sources is illustrated in FIG. 1. One aspect of the present invention is that code repositories 105, such as public code repositories, are searched. Public code repositories are repositories in which programmers can store a software project that they have worked on in an individual repository for others to view and comment on. Examples of repositories include Github, Inc. of San Francisco, Calif., which permits a programmer to push source code to a repository so that it is accessible and transparent to others. In Github, each project in a repository includes a file history listing each commit that changed the file along with the author (or authors) for each commit Other examples include sites operated by companies and organizations such as Bit Bucket, Google Code of Google, Inc. of Mountain View Calif., Source Forge, Launch Pad, and Type, the Apache foundation and the Mozilla foundation.

At least one other source of information is preferably accessed to obtain additional information for each profile. Another potential source of information the recruiting service can access are forum and discussion groups 110 used by programmers, such as Stack Overflow (operated by Stack Exchange, Inc. of New York, N.Y.), and news groups like Hacker News (a social news website about hacking and startup companies) or Android developer mailing lists. For example, forum and discussion groups may be used to provide a source of information on the reputation and influence of individual developers. Additionally another option is for the recruiting service to access general or social media sites 115, such as those provided by companies such as Facebook, Inc. and LinkedIn, Inc. Another source of information are contact services and social intelligence services 120, which provide resources to identify individuals from partial contact information and otherwise expand an initial set of contact information into a wider set of contact information and social information from which links to social media can be determined. More generally, other public information sources 125 may also be searched as well that are relevant to determining the influence, skills, or biographical information about software developers, such as professional network sites.

A user utilizes a computer 102 in communication with the recruiting service 100 via the Internet. The user's computer 102 displays a graphical user interface generated by the recruiting service 100. A user searching for candidates to fill a software development position accesses the recruiting service 100 to input a query 130 defining an initial candidate specification, such as proficiency in one or more programming languages. Other examples of a candidate specification include a geographical area specification. In response, the graphical user interface generated by the recruiting service provides a listing of profiles of potential candidates as illustrated by arrow 140, which may also be presented in a ranked order. The user can then request more detailed profile information for individual candidates. An exemplary set of profile information includes the number of years and relative ranking of the candidate in different programming languages, an influence score, overall experience level, a summary of programming projects and links to the projects, a summary of employment history, and social media information. A messaging link is preferably provided to permit the candidate to be contacted either directly via email (e.g., via either anonymous or non-anonymous email) or by other contact modalities (e.g., messaging, phone, etc.).

Figure 2:
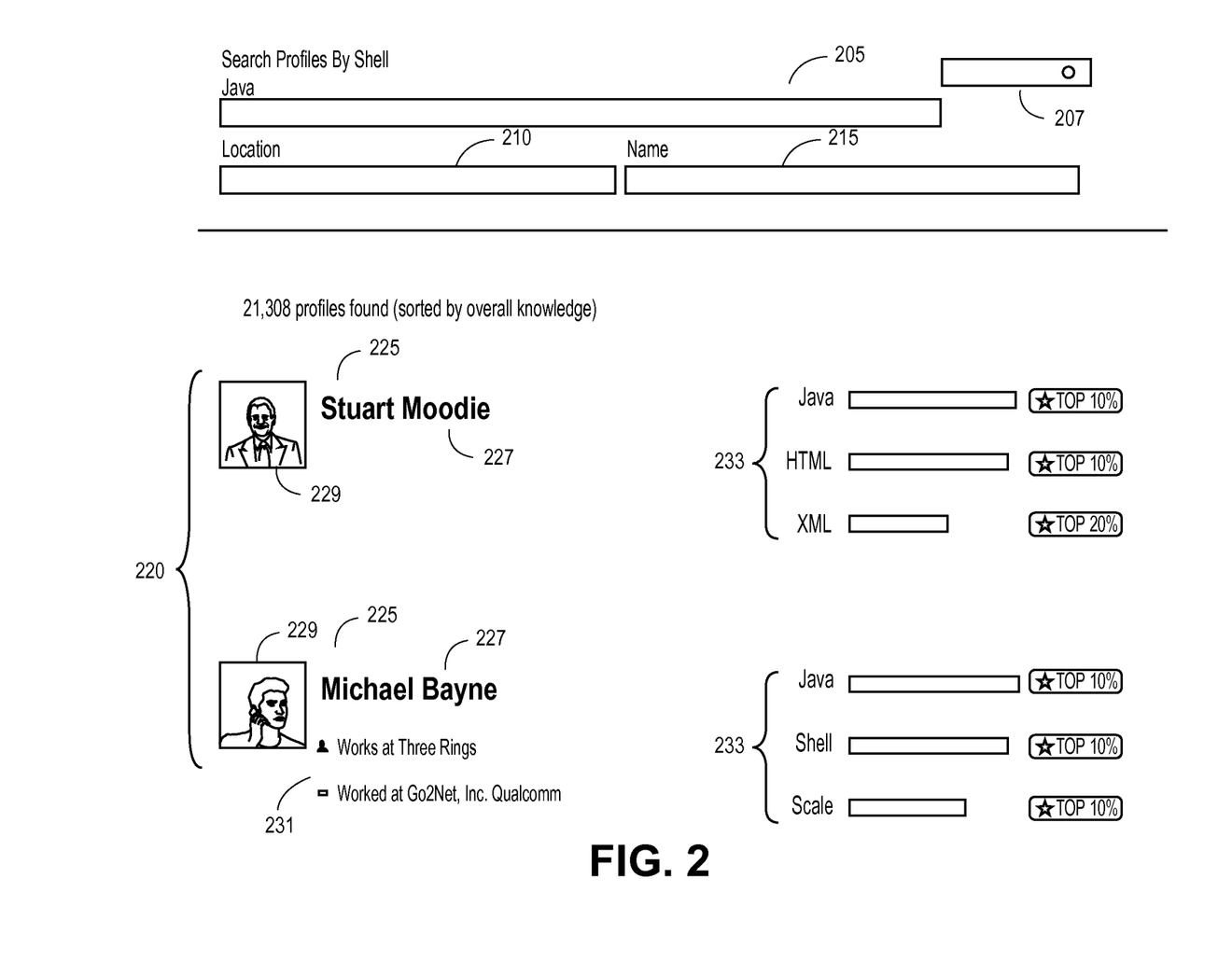
FIG. 2 is a screenshot illustrating a graphical user interface displaying an initial listing of profiles matching a query in accordance with an embodiment of the present invention.

FIG. 2 is a screenshot of an exemplary graphical user interface. A search field 205, permits a user to enter queries based on skills. For example, in one embodiment a user may input language skills and any Boolean logic operators (e.g., AND or OR) to define a skill portion of the query. A location search field 210 permits the query to be limited by geographical area and a name field 215 permits the query to be limited by name of the developer. Additionally, it is contemplated that other search fields could be included, if desired, to focus a search.

In this example, a skill query based on "Java" skills is input into search field 205. A search button 207 permits the search to be triggered. This results in an initial listing 220 of profiles 225. In one implementation the profiles are sorted and ranked by overall knowledge. Other profile information may be displayed in the initial listing such as the developer's name 227, photo 229 (if available), brief summary of employment history 231 (if available), and ranked scoring 233 in different programming languages including those in the query and other selected languages for the profile. Thus in this example, the ranked scoring includes the Java language ranking first (because the query was for Java) along with other top scores. The user interface may also provide an indication of the ranking in terms of the top rankings (e.g., through a set of top rankings, such as top 10%, 20%, or 30%) via a tab other visual indicator. Thus, the user can quickly search for profiles in the initial listing corresponding to developers that are knowledgeable and skilled in a language of interest.

Figure 3:
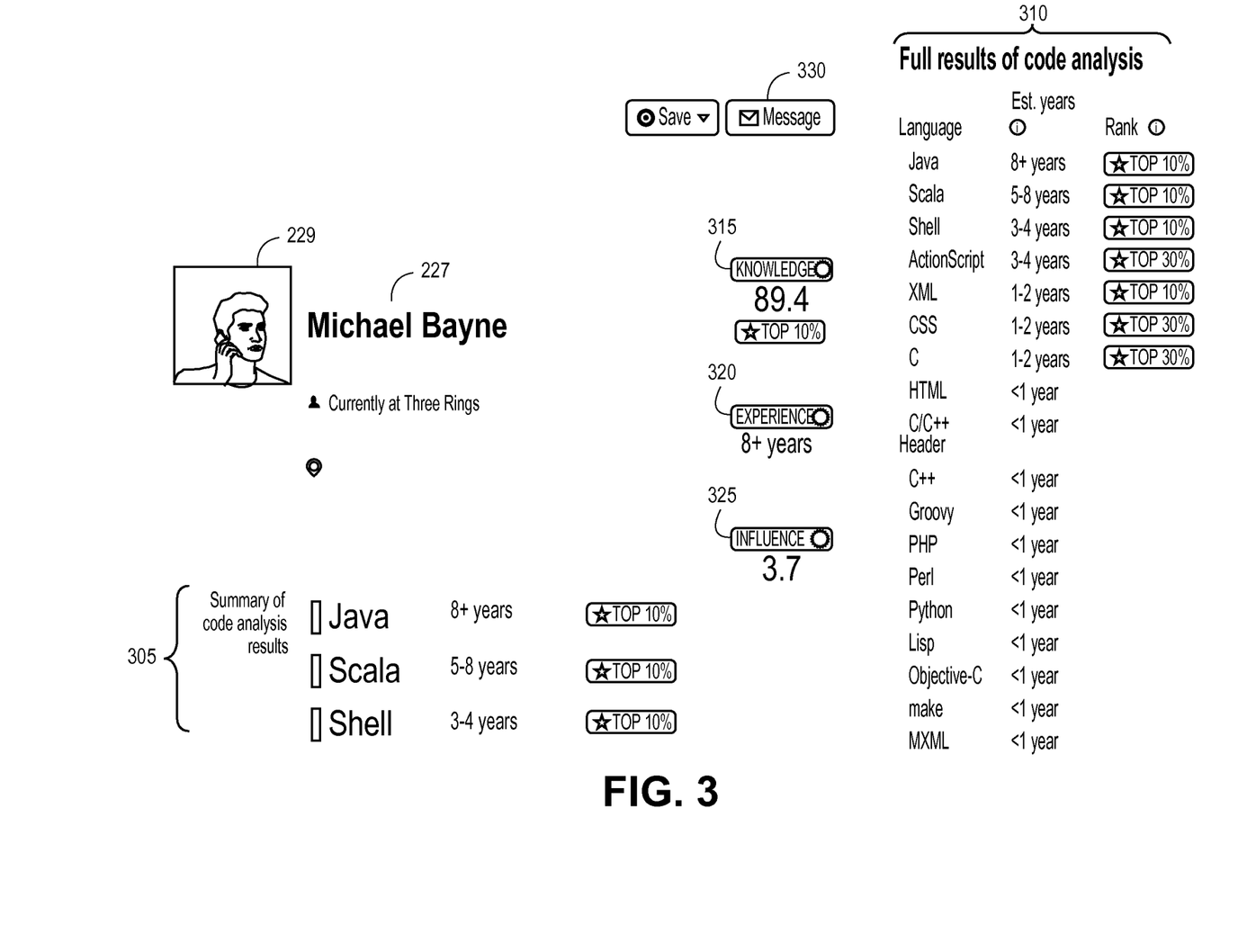
FIG. 3 is a screenshot illustrating the graphical user displaying a first portion of an individual profile in accordance with an embodiment of the present invention.

The graphical user interface permits a user to select an individual profile and then displays detailed profile information for the individual profile. FIG. 3 illustrates a first portion of an individual profile for a developer. The profile may include the person's name 227, photo 229 (if available), a brief summary of code analysis 305, full results of code analysis 310, knowledge ranking 315 (e.g., a number from 0 to 100), overall experience level 320 (estimated number of years of experience), influence score 325 (e.g., a number from zero to five), and a messaging link 330.

The code analysis 310 is based on analyzing code from code repositories to provide objective information regarding a minimum number of years of experience in a particular programming language as well as an objective analysis of the code itself to providing a ranking of the developer's skills. The full analysis includes the estimated number of years of experience with each language. Tabs are provided indicating top rankings (e.g., through a set useful to the end-user, such as top 10%, top 20%, top 30%, etc.). The number of views by others and the adoption of code by others may be used to generate the influence score 325 as a measure of how influential the programmer is.

Figure 4:
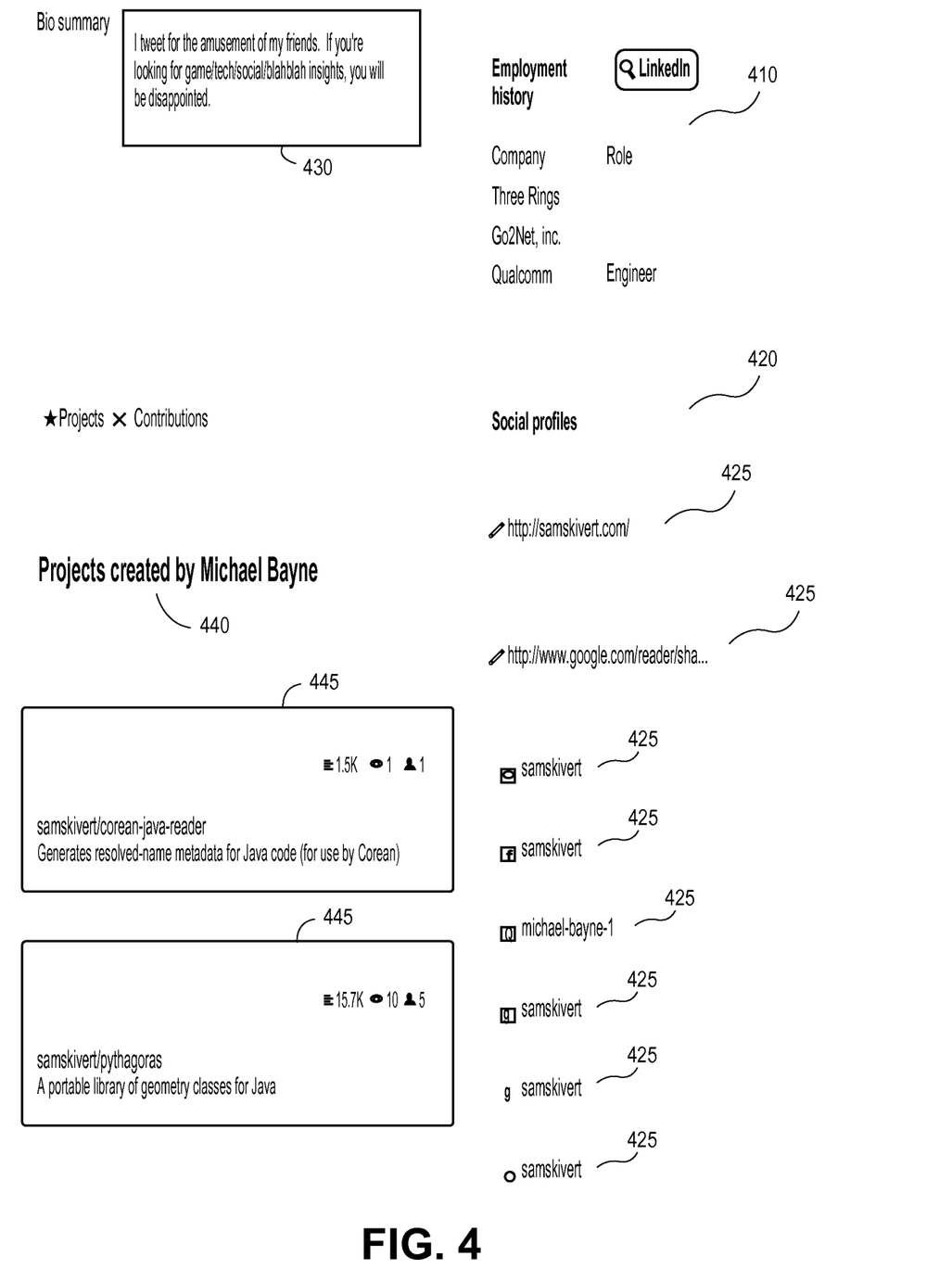
FIG. 4 is a screen shot illustrating the graphical user interface displaying a second portion of an individual profile in accordance with an embodiment of the present invention.

FIG. 4 illustrates a second portion of the profile for the developer. The employment history 410 of the developer is summarized when it is available. For example, such employment information is sometimes (but not always) posted on public websites such as LinkedIn. Social profile information 420 is provided, which may include links 425 to social media websites that the developer uses.

A bio summary 430 may be extracted from social media. Alternatively, in one embodiment, a software developer is permitted to check their profile and take ownership of their profile in the sense of providing some limited voluntary inputs, such as bio summary information, and also provide feedback on any errors.

A summary of projects 440 accessible in code repositories is also provided. The summary preferably also includes links to the code in the repository for each project 445 for users interested in performing a more detailed analysis of the code itself. Additionally, information about the project may be included such as file size in terms of number of lines of code, number of views by other developers, and number of collaborators.

Figure 5:
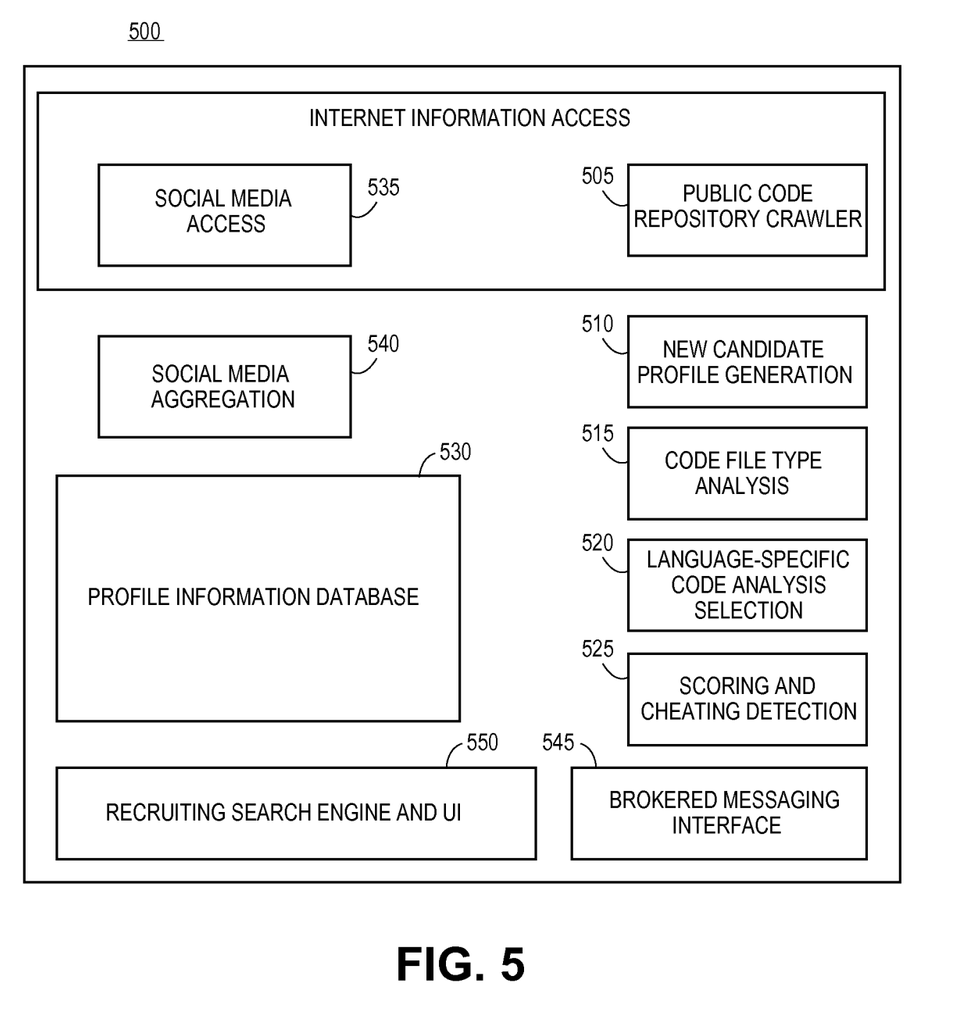
FIG. 5 is a block diagram of a recruiting service in accordance with an embodiment of the present invention.

FIG. 5 illustrates in more detail a functional block diagram of a recruiting service 500 in accordance with an embodiment of the present invention. The recruiting service 500 may reside on one or more servers with associated processors and memory, wherein the computer code is stored on a computer readable memory. A database memory may be provided to store information for the recruiting service, including candidate profile information.

A crawler 505 is provided to crawl code repositories. For example, the crawler may use an API for code hosting sites such as GitHub. A new candidate profile generation module 510 determines whether the crawler has identified a new developer. If so, a profile ID is generated to build a new profile. A code file type analysis module 515 determined the file type of files being crawled. After the file type has been determined, the language-specific code analysis module is selected by module 520. Scoring and cheating detection is then performed by module 525. Profiles are stored in a profile information database 530. A social media access module 535 provides access to social media information sites and a social media aggregation module 540 correlates aggregated social media information for individual profiles. A messaging interface 545 is included in one embodiment as a means for recruiters to contact individual developers. However it will be understood the messaging interface 545 may be omitted in some implementations. The messaging may, for example, be brokered in the sense of cloaking the user information and email address of the recruiter during initial attempts to contact a developer. A recruiting search engine and graphical user interface module 550 is responsible for generating the graphical user interface that is provided for display on a user's computer.

The new candidate profile generation module 510 utilizes author information from crawled sites to detect that there is a new developer to be added to the system. Code repository sites include author information for each project. This author information is searched by the crawler. Each individual person with a profile has a unique ID. The unique ID is created the first time an individual programmer's name is discovered in crawling author information in code hosting sites. For example, when the crawler finds the names of people that have contributed code to a code hosting site, the system compares the unique ID from the network that the person is found on to the unique IDs in the database of the recruiting service for that network. If an ID doesn't exist, a new user ID is created.

The crawling process generated project information for each developer. One way to obtain project information for a particular person is specifically ask a code hosting site (or content site like Stack Overflow) for a list of projects for each developer. For example, this may be done through an API for sites such as GitHub and Stack Overflow.

The crawling is updated regularly and the profiles are refreshed according to a cycle. An exemplary refresh cycle is a two-week profile refresh cycle. That is to say, the update from the crawlers may be constant, but the profiles may be updated according to a schedule, such as every two weeks.

One aspect of the crawling process is that the source code for a particular project is downloaded for analysis. As illustrative examples, the source may be downloaded using technologies such as Git, SVN, Mercury, and CVS, which are technologies that allow for synchronization with the local computer of a code repository.

It is preferable to download all of the available information in a repository for analysis. However, note that the source code for a project may be in any one of a variety of different file types.

Downloaded files are then processed, starting first with the code file type analysis module 515. An individual file is analyzed to determine what's in it by looking at file extensions and the binary data or text that the file contains. Specific patterns in the source code are analyzed. For example, specific languages—like Ruby—always start with a certain few lines of code—e.g. the hashbang—so that by looking for the patterns of a specific set of keywords in the file permits the language to be identified. Additionally, the analysis of the code can include looking for the "magic number"—a set of bytes at the beginning of the file that indicates file type. For example, images always start with a specific byte configuration. The pattern associated with each different file type is checked until a match is found. The pattern matching may be performed, for example, using a sequence of if-then clauses to identify the file type of a particular file.

After the file type is determined, the language specific code analysis selection module 520 makes a selection of an evaluation tool or tools appropriate for the language of the file type. Most software languages have evaluation tools to evaluate the quality and complexity of the coding. The evaluation tools are specific to a particular language and may, for example, look at the length of the code and patterns in the code. For many cases, the evaluation tools for a specific language are open source and/or available from commercial vendors. For example, there is a unique set of tools to evaluate Ruby—tools that differ from those used to evaluate C++. Thus if the recruiting service is designed to analyze code in languages such as Java, Scala, Shell, ActionScript, XML, CSS, HTML, Groovy, PHP, Perl, Python, Lisp, etc. then the system includes the corresponding evaluation tool for each supported language. Thus, the recruiting service includes a wide range of evaluation tools to support different languages and makes the selection of the proper evaluation tool based on the file type. The file is then analyzed using the appropriate selected tool(s) for the language associated with the file type.

The scoring and cheating detection module 525 utilizes the evaluation of the code and also information from the commit log for the file. To identify the author of the code of a particular file, the commit log is evaluated for the repository. The commit log is a list of who did what for the repository. This permits an evaluation of the developer's specific contribution (s) to that project. For example, by analyzing the commit log an evaluation can be made of the time(s) when the developer made a contribution.

The process is continued for all of the developer's repositories to permit a determination to be made of what languages that a person has experience in and how much experience the person has in each language. Recruiting service downloads all the developer's repositories and evaluates their contributions to determine the languages they've written code in. To evaluate experience the commit log is examined to look at the date and time of when the developer contributed to the project. Different factors can be used to determine actual experience. One factor is that contributions can be evaluated by their frequency and regularity to weight the actual number of years of experience in a particular language.

As an illustrative example, consider a developer named Joe. If Joe started contributing to a project 3 years ago, and the commit log shows that he's been contributing regularly to it, that's an indication that he has 3 years of actual experience. Thus, a weighting function can take into account the frequency and regularity of Joe's contributions. For example, if Joe has been making four or more contributions per year that's an indication that Joe has been regularly working on Java.

However, if Joe made a single contribution 3 years ago and just contributed again for the first time 2 months ago, then the commit log indicates "episodic" contributions with a wide spacing between contributions. For this second case, the weighting factor can be used to reduce Joe's number of years of experience such that he does not get 3 years of experience credit. The exact weighting function chosen can be empirically determined based on common behavior patterns of software developers. For example, if the commit log shows Joe made a single contribution to a Java project 3 years ago and made a second smaller contribution a month ago there could be a possibility that Joe is either 1) trying to "inflate" his resume about the number of years of experience he has in Java; or 2) may have become aware of the recruiting service and is intentionally trying to trick the recruiting service. In this example, the weighting function may also include one or more rules to discount recent contributions, particularly those of a minor character, such as a minor code tweak or a contribution made with many other contributors.

Thus, while the raw data provides an indication of a maximum potential number of years of experience, a weighting function may include different factors related to frequency of contribution, size of contribution, and number of co-contributors to perform a weighting function to arrive at a more accurate interpretation of the number of years of experience for a developer. The weighting function may be determined empirically, based on observations about the way software developers normally work, to optimize different weighting factors and periodically adjusted to discourage gaming of the system. Other types of gaming (such as posting the same code at different times on different sites or plagiarizing code from others) could also, in theory, be checked as part of a larger fraud detection function.

As an illustrative example, patterns in a commit log may be examined for suspicious factors of how the developer is developing his/her source code. The simplest example of a developer cheating is that the developer downloads someone else's source code, opens their own repository, and submits that same exact code to the new repository. In that case, there would be a huge update all at once, and then nothing else in terms of activity. This is inconsistent with normal commit log behavior in which a user normally makes a series of regular contributions over time. An honest developer would normally (except for perhaps extremely small projects) be consistently committing code they are developing for their project. As a result when a huge aberrant spike occurs in a commit log a presumption can be made that there is a high likelihood that cheating has occurred. In this case, the weighting function can severely or totally discount the project, i.e., give it extremely little or no credit.

As previously described, in one embodiment there are three kinds of scores that are calculated for each developer. These include knowledge, experience and influence. This level of scoring provides a variety of useful information to evaluate candidates. However it will be understand that the recruiting service could also be implemented with a subset of this set of scores.

The scores are preferably calculated on a language-specific basis and an overall basis Language specific scores are useful to evaluate skills in a particular language. However, generating an overall score provides an additional indicator of a developer's talent.

An exemplary language-specific scoring process will now be described. In one implementation, to determine a knowledge score, an examination is made of lines of code and the number of repositories that the developer has contributed to. The score is then calculated by a function that weights the total number of lines of code in all of the different repositories. That is, a developer who has written more lines of code has more experience and credit is given for contributing to different repositories. However, the number of lines of code can reach very large numbers. Thus, one way to score knowledge is apply a logarithm function based on the number of lines of code. As one example, a knowledge score for a developer can be generated using a natural log curve: ln(lines)×number of repositories, where "x" is the multiplication operation and this equation is a simplified equation to illustrate a general approach that one of ordinary skill in the art would further optimize for a particular implementation to optimize empirical results. Other variations based on a logarithm function are also possible and other factors could be included in determining a knowledge score.

An exemplary language-specific scoring process for experience looks at different factors indicative of experience and then weights the factors. For example, to calculate a total experience score the individual experience scores may be combined with work experience, i.e., Total Experience=Individual experience skill experience scores× work experience. Of course, many variations are possible in terms of weighting individual skills experience with work experience. In one implementation the process looks at the lines of code that have been written with particular attention to the lines of code written per day, in addition to commits per day, and the number of days of activity. A weighted function SUM(r) can be used to perform an initial analysis of experience in different skills. The scoring can be further weighted by work experience, resulting in simplified equation to determine a language-specific experience score: SUM(r)×Work Experience, where this equation is a simplified equation to illustrate a general approach that one of ordinary skill in the art would further optimize for a particular implementation to optimize empirical results.

An overall score can be calculating by weighting individual scores. An overall experience score can be determined as follows:

$$\text{Experience}=\text{Individual experience skill experience scores}\times\text{work experience.}$$

An overall knowledge score can be determined using different weighting approaches. In one approach a logarithm function is used to weight the sum of different knowledge skill scores so that a high score requires the developer to have a wide variety of skills:

Knowledge=ln(SUM(Skill Knowledge)), where this equation is a simplified equation to illustrate a general approach that one of ordinary skill in the art would further optimize for a particular implementation to optimize empirical results.

The influence score is a measure of the developer's influence in the larger developer community. In one embodiment the influence score includes how much the developer's code influences other developers. Additionally the influence score may include the developer's influence in social media. For example, the influence score may include a component based on how a developer's projects have influenced others, based for example on the number of followers, forks, and contributors, which may be determined from data within code hosting repositories. However, an individual developer may have different influence in different languages, which has to be taken into account in determining an overall influence score. Additionally, the developer's influence in social media may also be considered, such as weighting the influence in social media by a weighting function. For example, one measure of influence in social media is a Klout score. Thus an exemplary overall influence score may be determined as follows:

$$\text{Influence}=f(Klout)+\ln(\text{SUM(Skill Influence)})$$

where a developer is given credit for influence in different skills may also be given some credit for social media influence and where this equation is a simplified equation to illustrate a general approach that one of ordinary skill in the art would further optimize for a particular implementation to optimize empirical results.

The scoring and weighting functions that are applied are determined empirically to give a desired distribution based, for example by examining what weighting functions give the best real-world results at a particular point in time for recruiters. Thus, for example, the actual constants used as weighting factors and aspects of the weighting functions may be varied based on feedback on the usefulness of the scoring for simulated or actual recruiting efforts.

For example, when calculating knowledge, one approach is to look for extensive experience in several languages. This is because in the real world highly knowledgeable developers have a broad range of experiences to draw upon and are skilled in different languages. Thus, even if a developer has top 10% scores in one or two languages, they cannot get a top 10% overall knowledge score, because that only happens when the developer has top-tier scores in several languages. That is to say, breadth counts.

The public code repositories are crawled on a regular basis. In one embodiment all the raw data obtained from a crawl of the public code repositories is saved, except for the source code. That is, it is preferable to save the information obtained by analyzing the code, in addition to the source log itself. The next time the crawler encounters that repository, the source code is downloaded again, and a "refresh" is made based on new contributions. Additionally, the logs are checked to determine the individual(s) that made the new contribution. Thus, if Michael has a repository with a project, the system will also confirm from the log entries who made any new contributions. Thus if Luca makes a follow-on contribution to Michael's project, the follow-on contribution will be credited to Luca. This cross-checking of which individual made which new contribution to a project is useful to improve accuracy and reliability of the scoring.

The social media access module 535 and the social media aggregation module 540 provide a comprehensive set of social media links for each profile. The author information obtained from public repository sites such as GitHub and Stack Overflow may be incomplete or contain inaccuracies. However typically the author information will include at least an email address and perhaps also a name. This information can then be used to obtain additional social media information using commercial services such as Full Contact, Inc. of Denver, Colo., Fliptop, Inc. of San Francisco, Calif. and Rap Leaf of San Francisco, Calif. Many commercial services check by unique information, like email address, or a hash of the email address (a hash is a unique number generated by an email address. That way, companies can match users by email addresses, but protect their privacy by looking at hash numbers). In one embodiment a search of social media sites is performed of all of the sites listed under Full Contact's set of Social Network Types. From this information profile information identifying the names of developers may be generated along with associated information. For example, work history may also be scraped from social networking sites.

Direct scanning of social media sites is also an option, such as the option of scanning sites such as LinkedIn and Google Plus. However, there's usually not a one-to-one results process. For example, if a developer has a common name, such as "John Smith," a scan based on their name may turn up more than one hit. To find additional social media links for a particular profile it is thus desirable to look for multiple matching factors (location, title, company, name, etc.), and then calculate the probability that it's a match. If the probability is higher than a certain number, the system automatically merges the profiles. If the probability is less than that threshold, the system sends a notification that there needs to be a manual review process.

Once links to social media are identified for a developer they can be refreshed at a rate slower than other information in the public code repositories. Individuals typically add new social networks infrequently and the URLs of social media sites are generally static.

The graphical user interface discussed in this application includes a set of features that are useful in making recruiting decisions. However, it will be understood that subsets of these features may be used. That is, one of ordinary skill in the art would understand that variations in the graphical user interface to include variations of what has been described are possible.

It will also be understood that the scoring techniques described are exemplary. As software evaluation tools increase in their capabilities it will also be understood that other metrics of coding quality and/or complexity could be utilized.

While the invention has been described in conjunction with specific embodiments, it will be understood that it is not intended to limit the invention to the described embodiments. On the contrary, it is intended to cover alternatives, modifications, and equivalents as may be included within the spirit and scope of the invention as defined by the appended claims. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. Methods and graphical user interfaces of the present invention may also be tangibly embodied as a set of computer instructions stored on a computer readable medium, such as a memory device.

What is claimed is:

1. A computer implemented method of providing information for recruiting software developers executed on a computer including a processor, a memory and a network interface, comprising:

receiving, in the processor via the network interface, first information identifying a plurality of individual software developers and second information associated with their respective programming skills;

for each of the plurality of individual software developers, receiving, in the processor, via the network interface, software code in a first programming language associated with a software project and commit logs with information describing changes to the software project over time;

for each of the plurality of individual software developers, based upon the software code and the commit logs, generating, in the processor, an estimate of a number of years of experience in the first programming language which each of the plurality of the individual software developers possesses including checking the software code and commit logs for cheating;

receiving, in the processor, a query specifying programming skill in the first programming language to a user; and generating, in the processor, a graphical user interface that is displayed to the user in response to the query, the graphical user interface including profiles of individual software developers fulfilling the query and a ranking of the individual software developers fulfilling the query wherein the estimate of the number of years of experience in the first programming language is used in the ranking.

2. The method of claim 1, further comprising receiving, in the processor via the network interface, information indicating one or more of 1) a number of followers of software projects attributed to a first individual software developer, 2) a number of forks from the software projects attributed to the first individual software developer, 3) a number of contributors to the software projects attributed to the first individual software developer or combinations thereof, and based upon the number of followers, the number of forks, the number of contributors or combinations thereof, generating in the processor an influence score which measures first individual developer's influence in a general software developer community wherein the influence score is output via the graphical user interface.

3. The method of claim 1, wherein for at least one of the plurality of individual software developers the software code is written in the first programming language and a second programming language and further comprising, based upon at least an analysis of the software code in the second programming language and the commit logs, generating a second estimate of a second number of years of experience in the second programming language.

4. The method of claim 1, wherein the estimate of the number of years of experience in the first programming language and the second estimate of the number of years of experience in the second programming language are used in the ranking.

5. The method of claim 1, for each of the plurality of individual software developers, searching social media sites for supplemental information and for at least a first individual software developer, receiving first supplementation information and adding the first supplemental information to a first profile maintained for the first individual software developer.

6. The method of claim 1, further comprising in response to receiving a selection via the graphical user interface, outputting a first profile of a first individual software developer.

7. A computer implemented method of providing information for recruiting software developers executed on a computer including a processor, a memory and a network interface, comprising:
establishing communications in the processor via the network interface with one or more code repositories in which software developers post software projects including software code associated with the software projects and commit logs including information describing changes to the software projects over time;
identifying in the processor a plurality of software developers which have posted software projects to the one or more code repositories;
for each of the plurality of software developers, receiving in the processor, software code written in at least one programming language and one or more commit logs associated with the software code;
for each of the plurality of software developers, generating in the processor an estimate of a number years of experience in a first programming language based upon the software code written in the first programming language and the one or more commit logs including checking the software code and the one or more commit logs for cheating;
for each of the plurality of software developers, performing in the processor a search of other information sources for additional information, including searching least social media websites;
for each of the plurality of software developers, generating in the processor a profile including the estimate of the number of years of experience in the first programming language and any additional information received from the information sources; and
generating in the processor a graphical user interface that is displayed to a user in response to the user inputting a query including a programming skill which at least specifies the first programming language, wherein the graphical user interface includes profiles of individual software developers fulfilling the query and a ranking of the individual software developers fulfilling the query and wherein the ranking is based upon at least the estimate of the number of years of experience in the first programming language.

8. The method of claim 7, wherein a profile of each individual software developer includes at least one or more of: social media links associated with the each individual software developer, a listing of each individual software developer's software projects in the one or more code repositories, an influence score determined at least in part from the each individual software developer's software projects in the one or more code repositories, a knowledge score, the estimate of the number of years of experience determined from the each individual software developer's software projects in the one or more code repositories, a messaging link associated with the each individual software developer, a skill ranking determined from the each individual software developer's software projects in the one or more code repositories or combinations thereof.

9. The method of claim 7, wherein the user interface includes an initial listing of software developers satisfying the query ranked based on overall experience wherein for at least a first software developer in the initial listing, the overall experience is based upon generating a second estimate of a second number of years of experience in a second programming language.

10. The method of claim 7, wherein the query specifies one skill different from the programming skill and wherein the graphical user interface includes an initial listing of software developers satisfying the query along with the ranking of each developer with respect to the at least one skill of the query.

11. The method of claim 10, wherein the initial listing further includes a ranking for skills commonly associated with the at least one skill set forth in the query.

12. The method of claim 7, further comprising receiving a listing of each individual software developer's software projects in the one or more code repositories and outputting the listing of each individual software developer's software projects via the graphical user interface.

13. A method in a computer including a processor and a memory, comprising:
receiving, in the processor, software code associated with a software project written by a software developer in one or more programming languages and commit logs describing changes to the software project over time;
generating an estimate of a number of years of experience in each of the one or more programming languages based upon the software code and the commit logs including checking the software code and the commit logs for cheating;
generating in the processor a graphical user interface which is output to a display in response to a query which includes at least one of the one or more programming languages, the graphical user interface including:
a profile of the software developer; and
a ranking of the software developer with respect to other software developers based on the estimate of the number of years of experience in the at least one of the one or more programming languages.

14. The method of claim 13, wherein the graphical user interface further includes: social media information associated with the software developer.

15. The method of claim 13, wherein the profile further comprises:
an influence score based at least in part on an evaluation of the software project; and
a knowledge score based on the evaluation of the software project.

16. The method of claim 13, wherein the graphical user interface further comprises:
a messaging interface to contact the software developer.

17. A computer implemented method of providing information for recruiting software developers executed on a computer including a processor, a memory and a network interface, comprising:
establishing, in the processor, via a network interface communications with a code repository storing software projects attributed to individual software developers and commit logs including information describing changes to the software projects over time;
identifying, in the processor, one or more of the individual software developers from the code repository;

for each of the one or more individual software developers, receiving, in the processor, software code written in at least one programming language associated with the software projects and one or more commit logs associated with the software code;

for each of the one or more individual software developers based upon the software code and the one or more commit logs, generating an estimate of a number of years of experience in the at least one programming language and checking the software code and the one or more commit logs for cheating;

generating profile information for each of the one or more individual software developers wherein the profile information includes the estimate of the number of years of experience in the at least one programming language;

receiving a query specifying at least one skill of interest; and generating a graphical user interface that is displayed to the user in response to the query that provide profiles of the one or more individual software developers matching the query.

18. The method of claim 17, further comprising generating an estimate of a minimum number of years of experience in the at least one programming language based upon dates associated with the software projects in the code repository.

19. The method of claim 17, further comprising generating an estimate of a number of years of experience in each of a plurality of programming languages used in software projects in the code repository.

20. The method of claim 17, further comprising ranking the one or more individual software developers based on at least one attribute of one of the software projects posted in the code repository.

21. The method of claim 17, further comprising searching social media sites for supplemental information associated with the one or more individual software developers and adding the supplemental information to the profile information.

22. The method of claim 21, wherein the supplemental information includes an employment history generated from the social media sites.

23. The method of claim 21, wherein the profile information includes links to one or more of the social media sites.

24. The method of claim 17, wherein the profile information includes an influence score generated based on an influence of each individual developer's software projects within the code repository.

25. The method of claim 17, wherein the profile information includes links to the software projects posted in the code repository.

26. The method of claim 17, wherein the profile information includes contact information.

* * * * *